Patented Apr. 30, 1946

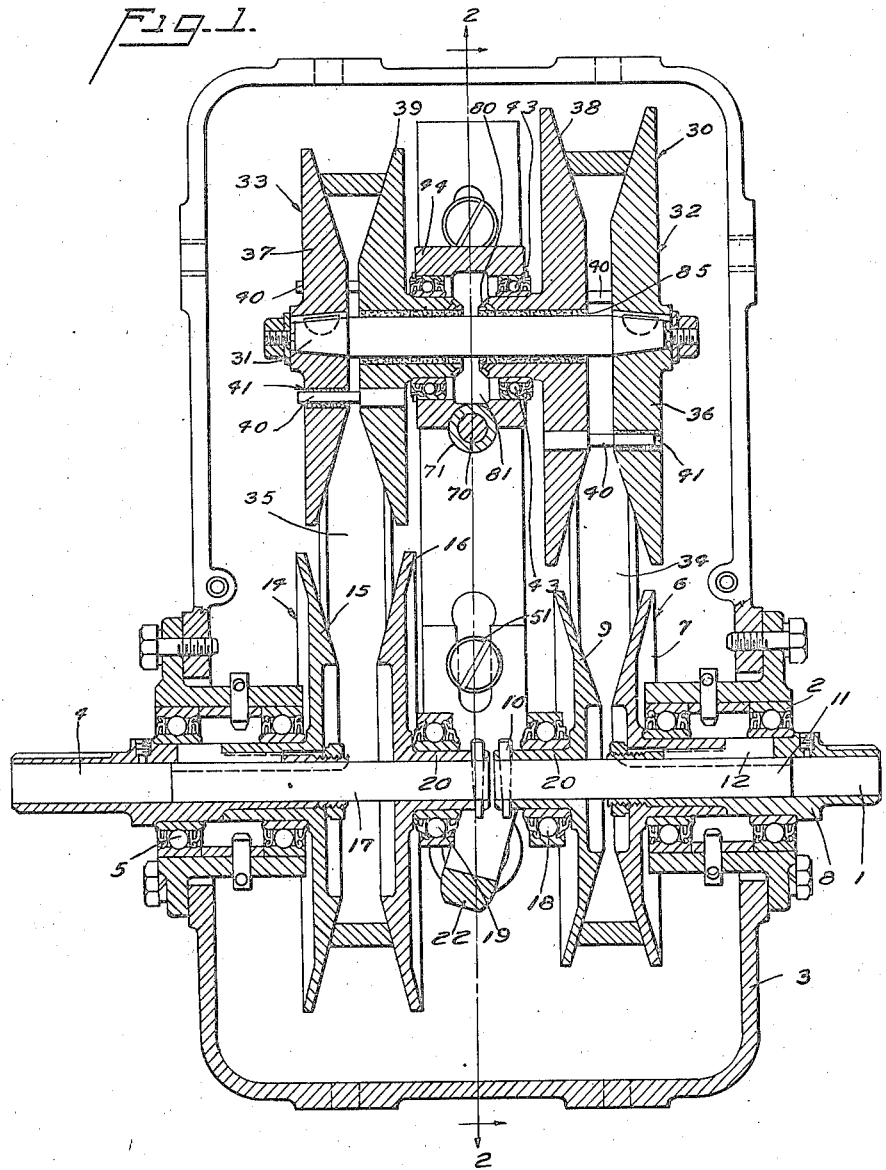

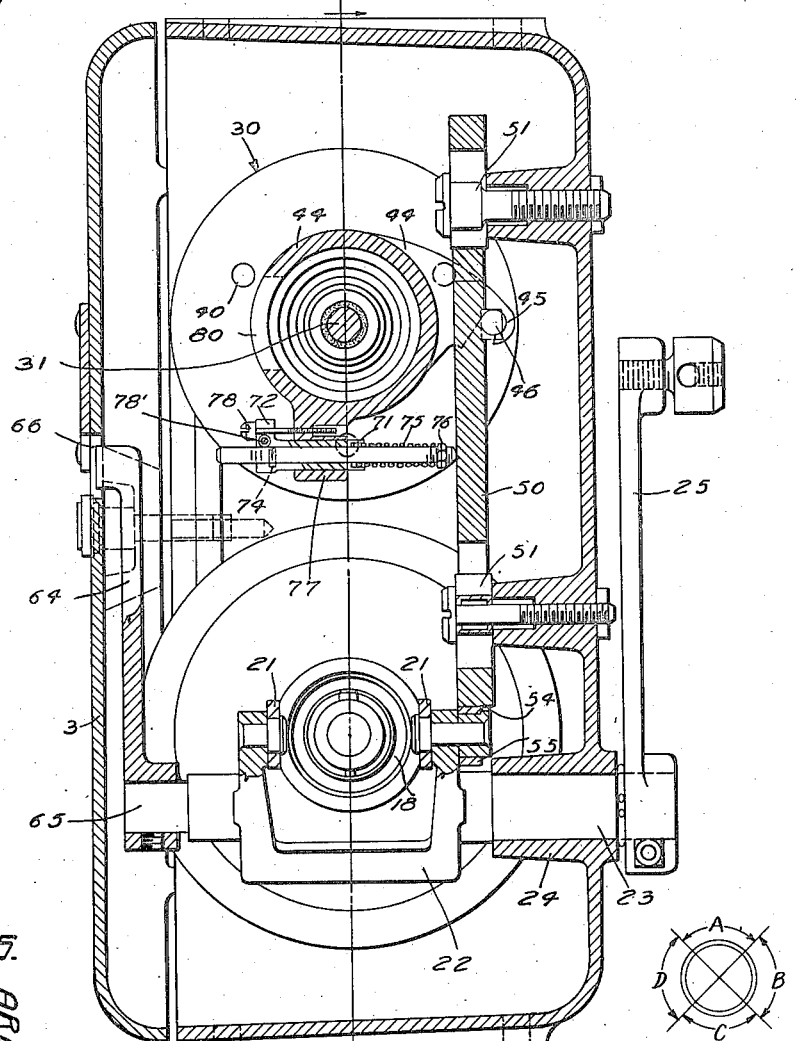
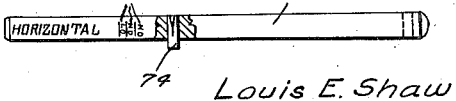

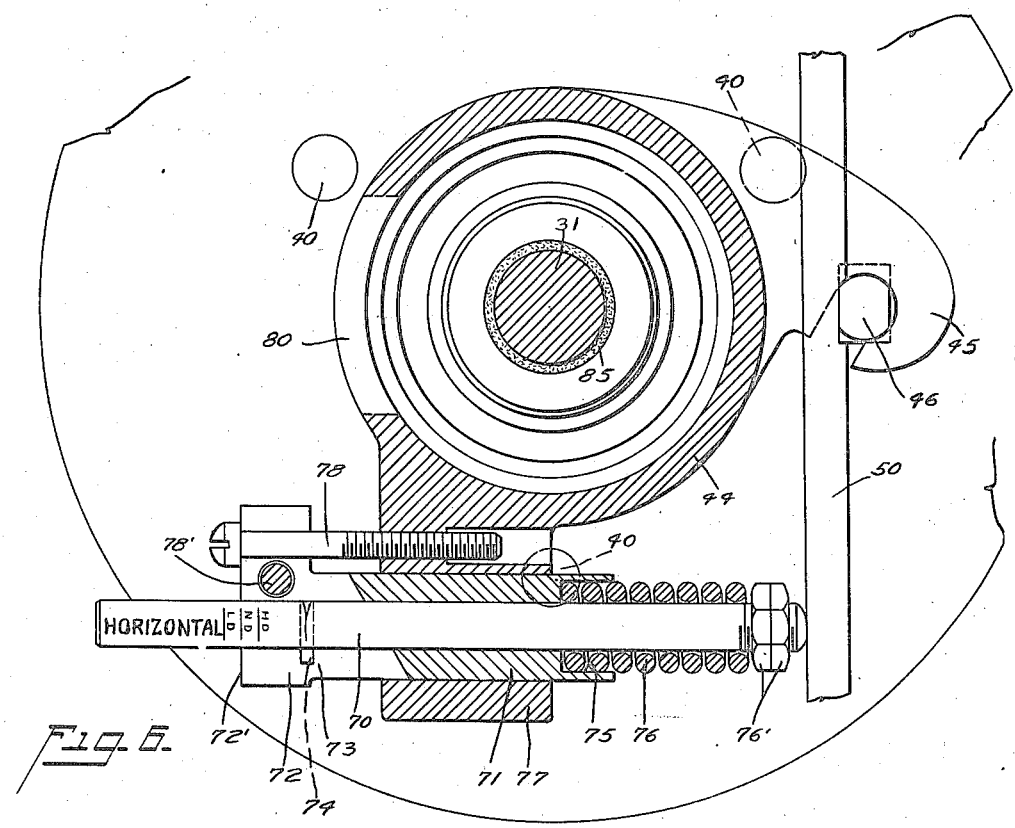
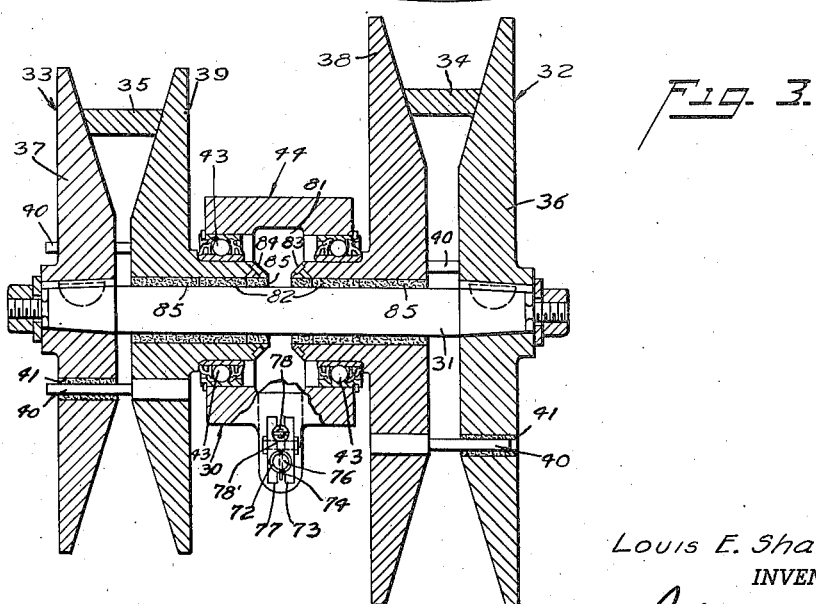

2,399,452

UNITED STATES PATENT OFFICE 2,399,452

VARIABLE-SPEED TRANSMISSION

Louis E. Shaw, East Orange, N. J.

Application December 21, 1943, Serial No. 515,079

11 Claims. (Cl. 74—230.17)

This invention relates to variable speed transmissions of the V-belt type in which a driving member is in driving, belted relation with a driven member through the agency of a speed adjuster or changer including a pair of expansible sheaves having V-belts engaging them, and wherein by varying the radius of the arc which the belts travel around their associated expansible sheaves, the speed ratio beween the driving and driven members may be varied at will.

In drives of the type outlined, embodying expansible driving and driven sheaves which are connected in power transmission relationship through intermediate expansible transmission sheaves carried by a jack or countershaft, the center distances between the driving and driven sheaves and the countershaft must be varied with variation of the radii of the arcs which the belts travel around their associated expansible sheaves, otherwise, in certain positions of adjustment, the belts will be slack resulting in slippage, excessive wear on the belts, and a decrease in the efficiency of the drives.

The primary object of the present invention is to provide means whereby the belts may be subjected to the correct initial tension, irrespective of the position in which the drive is installed and without depending on the judgment of the operator.

In practical use of variable drives of this type, it has been found undesirable to keep the belts under spring tension at all times, since due to commercial variations in the width of the belts, the spring will be compressed slightly each time a wider section engages one of the sheaves, and thus the movable or floating shaft will be caused to jump or vibrate. Under these conditions, the belt will alternately grab and slip unless the spring tension is made so great that the belt itself is deformed. In laboratory tests it has been found necessary, when using a spring tension, that the tension be approximately double that required for the effective operation of belts under conditions in which the belt centers are rigidly fixed, and this unnecessary tension not only increases wear, but also reduces the efficiency through friction and heat caused by the wedging action of the belts in the sheaves.

It is an object of the present invention, therefore, to overcome this difficulty and undesirable feature in such drives, by providing means whereby the correct initial tension may be applied to the belts, and the parts then locked in position so as to give the effect of rigidly positioned shaft and belt centers.

Another object of the present invention is the provision of a novel method of connecting the flanges of the sheaves on the floating or movable jack shaft of the drive which is simple and inexpensive; provides a corresponding surface bearing between the flanges and the shaft, and one in which the surface pressure on the connecting means is reduced thus reducing wear and making shifting of the shiftable flanges easier.

With these and other objects in view, as may appear from the accompanying specification, the invention consists of various features of construction and combination of parts, which will be first described in connection with the accompanying drawings, showing a variable speed transmission of a preferred form embodying the invention, and the features forming the invention will be specifically pointed out in the claims.

In the drawings:

Figure 1 is a vertical section through a variable speed drive constructed in accordance with the present invention, and taken on the line 1—1 of Figure 2.

Figure 2 is a vertical section through the drive taken on the line 2—2 of Figure 1.

Figure 3 is an enlarged detail section of the floating or jack shaft structure.

Figure 4 is a detail view of a tension indicator rod employed in the drive.

Figure 5 is a development of the graduated surface of the indicator rod.

Figure 5a is an end view of the tension indicator rod showing the relations of the development of the graduated surface shown in Figure 5.

Figure 6 is an enlarged detail section of the mechanism for providing the correct initial tension on the belts.

Referring more particularly to the drawings, the improved variable speed transmission comprises a drive shaft 1 rotatably supported by suitable bearings 2 carried by the housing 3, and a driven shaft 4 which is also rotatably supported by suitable bearings 5 carried by the housing 3. The driving shaft 1 has an expansible sheave 6 mounted thereon for rotation therewith which sheave comprises the sheave section 7 mounted rigidly upon the hollow section 8 of the driving shaft 1 for rotation therewith, and the second co-operating sheave section 9. The second sheave section 9 is movable axially relative to the sheave section 7 for varying the width of the V-groove of the sheave as formed by the facing sides of the sheave sections 7 and 9. The sheave section 9 is pinned by means of a pin 10 to the stub shaft 11 which is connected to the hollow section 8 of the driving shaft 1 by means of a key 12 for rotation with the hollow section but for longitudinal movement relative thereto so as to permit variation in the size of the V-groove of the sheave.

The driven sheave 14 is of the same construction as the driving sheave 6, that is, it comprises a sheave section 15 which is connected to the driven shaft 4 for rotary movement therewith and which is held against axial movement, and the movable sheave section 16. The movable sheave section 16 is carried by the stub shaft 17, the latter being connected to the driven shaft 4 for rotary movement therewith in such manner as to permit axial movement relative to the driven shaft to vary the size of the V-groove in the sheave 14.

The movable sheave sections 9 and 16 have thrust bearings 18 and 19, respectively, mounted upon the hubs 20 of the sheave sections. As will be noted by referring to Figure 1 of the drawings, the movable sheave sections 9 and 16 are disposed in back to back relation with their hubs 20 extending towards each other.

Members 21 are rotatably carried by the arms of a U-bar 22 and engage against the thrust bearings 18 and 19. The diameter of these members 21 determines the distance between the facing sides of the thrust bearings 18 and 19. The members 21 may be in the form of rollers, blocks or other suitable structure. The U-bar 22 is journaled at one end to fit a suitable bearing 24 formed in the housing 3, and an actuating arm or lever 25 is connected to the extended portion of the trunnion 23 for rocking the U-bar 22 to shift the movable sheave sections 9 and 16 for varying the relative sizes of the V-grooves of the expansible sheaves 6 and 14 synchronously to provide variable speed ratios between the driving shaft 1 and the driven shaft 4 through the medium of the speed change unit generically indicated at 30. At its opposite end, the U-bar 22 is trunnioned as at 65. An indicator arm 64 is carried by the trunnion 65 and is visible through an opening 66 in the housing 3 to permit visible indication of the relative widths of the grooves of the sheaves 6 and 14.

The speed change unit 30 comprises a counter or jack shaft 31 on which is mounted a driven sheave 32 and a driving sheave 33. The driven sheave 32 is connected to the driving sheave 6 by means of a V-belt 34, while the speed change driving sheave 33 is connected to the driven sheave 14 by means of a similar conventional form V-belt 35.

The speed change driven and driving sheaves 32 and 33, respectively, are expansible as are the driving and driven sheaves 6 and 14, being composed of sections 36 and 37 which are keyed or pinned to the counter or jack shaft 31 for rotation and axial movement therewith, together with the inner sheave sections 38 and 39. The sheave sections 38 and 39 are mounted upon the counter or jack shaft 31 for rotational and longitudinal sliding movement on the shaft. These movable sections 38 and 39 each carry a plurality of connecting driving pins 40 arranged at predetermined radial distances from the axis of the sheave sections and in circumferential spaced relation to each other. The pins 40 slidably extend through suitable openings 41 formed in the sheave sections 36 and 37 for connecting the sheave sections 38 and 39 to the sheave sections 36 and 37, respectively, for rotation therewith but to permit movement of the sheave sections 38 and 39 longitudinally of the axis of the shaft 31 independently of movement of the shaft and sheave sections 36 and 37. In operation, the sheave sections 36 and 37 will move in the same axial direction with and in direct proportion to or synchronously with the movement of the movable sections 9 and 16 of the driving and driven sheaves 6 and 14, respectively, under operation of the arm or lever 25 so as to vary the speed ratio between the driving sheave 6 and the driven sheave 14 in direct proportion to the variation of the sizes of the V-grooves in the sheaves and the consequent variation in the arc radii of the V-belts as they pass about the sheaves.

The openings 41 have bearing sleeves of sintered metal therein which as is well known, is porous and can be filled with sufficient oil to provide lubrication over long periods of time. These lubricating bearing sleeves are provided to reduce friction and wear occasioned by the sliding movement of the pins 40 through the openings 41.

The counter or jack shaft 31 is rotatably supported by means of suitable bearings 43 carried by a supporting member 44. The supporting member 44 is pivotally connected by means of an open hook 45 and trunnion block 46 carried by a movable cam bar 50. As will be noted by particular reference to Figure 2 of the drawings, the pivotal hook member 45 is constructed so that the counter or jack shaft and its companion structure may be lifted off its pivotal connection with the trunnion 46 which facilitates the changing of belts as well as the removing of the entire speed change assembly for the purposes of cleaning, re-oiling, etc. While only one hook 45 is illustrated in the drawings, it is to be understood that two may be provided if necessary to properly support the floating speed change structure 30.

Adjustments of the sheaves 6 and 14 to vary the speed ratios between the driving and driven shafts 1 and 4 by regulating the widths of the V-grooves in the sheaves and consequently the radius in the grooves at which the V-belts engage, requires a variation, within relatively small limits however, of the distance between the axis of rotation of the arcuate ends of the belts. If no provision were made for correspondingly varying the distances between the axes of the driven and driving sheaves and of the counter or jack shaft 31, it would result either in slipping of the belts or excess stress on the belts, depending upon the directional adjustment of the sheave sections, with consequently excessive wear on the belts and decrease in efficiency of the drive. The invention disclosed in my companion application, Serial No. 426,114, filed January 9, 1942, now matured into Patent No. 2,342,604, issued February 22, 1944, comprehends means for mechanically varying the distances between the axis of the driving and driven shafts and the axis of the counter or jack shaft in proportion to the speed changing adjustments of the sheaves so as to eliminate the disadvantages above outlined, and the present application and invention embraces an improvement over this mechanism and embodies the same fundamental type of mechanism for automatically adjusting the distances between the axes of the counter shaft and the driving and driven shafts.

This mechanism includes the cam bar 50 which is slidably supported by the casing 3 in any suitable manner such as indicated at 51. The lower end of the cam bar 50 has a cam surface 54 formed thereon which engages the periphery of a cam roller 55 carried by the U-bar 22. The cam or roller 55 has its axis in alignment with the axis of the members or rollers 31 which are carried by the U-bar 22, so that the cam 55 will move in synchronism with the movement of the members 21, and, consequently, in unison with the movement of the movable sections 9 and 16 of the driving and driven sheaves 6 and 14. The movement of the cam 55 over the cam surface 54 of the cam bar 50 will move the cam bar longitudinally, and, consequently, will move the counter or jack shaft 31 in direct proportion to the adjustment of the sheave sections 9 and 16 so as to vary the distance between the axes of the driving and driven sheaves 6 and 14 and the counter shaft 31 for maintaining the belts 34 and 35 under the proper tension at all times. It is understood, of course, that the cam surface 54 on the cam bar 50 is accurately plotted so as to provide the proper movement of the counter shaft 31 in relation to the driving and driven sheaves 6 and 14. The cam bar 50 and its companion mechanism is specifically illustrated, described and claimed in my companion application, Serial No. 426,114.

For the purpose of eliminating vibration of the floating or counter shaft, and reducing excessive wear on the belts as hereinbefore referred to, adjustable means is provided for applying initial tension on the belts 34 and 35 and holding the floating counter shaft 31 and the speed change gear mechanism carried thereby in adjusted positions relative to the cam bar 50 so as to provide, in effect, rigidity of position of the shaft and belt centers relative to the cam bar.

This mechanism comprises a rod or bar 70 which is slidably carried by a carrying sleeve 71. The sleeve 71 has an enlarged, substantially rectangular shaped head 72 formed thereon which is split longitudinally as shown at 73. The rod or bar 70 has a pin 74 extending therethrough which fits in the slot 73 to prevent turning movement of the rod relative to the sleeve 71.

The sleeve 71 is slidably carried in an extension 77 formed on the housing 44. An adjusting screw 78 is carried by the head 72 of the sleeve and threads into the extension 77 for adjusting the position of the sleeve relative to the extension 77 and also relative to the bar 70. The sleeve 71 has a counterbore 75 formed in its end remote from the head 72, and this counterbore receives therein one end of a spring 76 which is coiled about the rod 70. Locknuts 76' are threaded on the end of the rod 70 and abut the outer end of the spring 76. The rod 70 has a series of graduations 79 thereon near its end which extends through the split head 72. A development of these graduations is shown in Figure 5 of the drawings, there being four sets of the graduations spaced about the circumference of the rod. The graduations, as is shown in Figures 4 and 5 of the drawings are indicated HD for heavy duty, ND for normal duty, and LD for light duty. The four different sets of graduations are indicated by the legends Upright, Horizontal, Inverted, and Horizontal so that when the variable speed transmission is utilized in any one of the four positions enumerated a set of the graduations 79 will be visible to facilitate the proper adjustment of the sleeve 71 as hereinafter described.

When originally assembling a variable speed transmission embodying the present invention, the spring 76 is tensioned by means of the nuts 76'. To accomplish this, the sleeve 71 is rigidly held in a suitable fixture, with the spring 76 and the rod 70 in position therein. A pre-determined thrust in pounds corresponding to that required for one of the graduations 79 is applied to the rounded end of the rod 70, thus compressing spring 76. The nuts 76' are then adjusted until the selected graduation is exactly flush with the face 72' of the sleeve 71. The nuts are then locked together by holding the one contacting the spring 76 stationary while the other is tightened against it. The parts are then assembled in the bracket 44 as shown in Figure 6, with the belts in position on the sheaves, and the adjusting screw 78 is rotated to adjust the sleeve 71 relative to the rod 70 until the graduation 79, corresponding to the type of duty to be performed by the transmission, is brought into alignment with the outer finished end 72' of the head 72 after which the nut on the locking bolt 78' is tightened to lock the sleeve and rod in the proper position for applying the predetermined initial tension to the belts. Thereafter, the floating speed change mechanism is, in effect, anchored or locked in position so as to give the effect of rigidly positioned shaft and belt centers, and the tension on the belts is maintained upon speed change shifting of the driving and driven sheaves, through the movement of the cam bar 50 thus eliminating vibration or hunting movement of the floating speed change mechanism during the operation of the drive which might be occasioned by slight irregularities in belt width or the like.

In the event that the belts become loose through use, the locking nut on the lock bolt 78' is loosened which releases the rod 70 and sleeve 71 for relative movement. Immediately upon the release of the locking bolt 78', the spring 76 will act to apply the predetermined initial tension to the belts and in so doing the position of the graduations 79 relative to the finished face 72' will be changed. The adjusting screw 78 is then operated to bring the desired graduation back into alignment with the face 72', and the locking bolt 78' is tightened in locking position which will re-apply or again apply the predetermined initial tension to the belts and lock the various elements in their proper positions.

As clearly shown in Figure 6 of the drawings, the bracket 44 is provided with an opening at 80, through which access may be had to the screw plugs 83 and 84 for the purpose of replenishing the lubricant in the felt cylinders 82, the lubricant being then fed as needed to the porous metal bushings 85 within the bores of the flanges 38 and 39.

It will be understood that the invention is not to be limited to the specific construction or arrangement of parts shown, but that they may be widely modified within the invention defined by the claims.

What is claimed is:

1. In a variable speed drive of the V-belt type, the combination, of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, means operated by said shifting means for varying the distance between the axes of the driving and driven sheaves and the axis of the speed change sheaves in predetermined ratio to the speed change shifting of the driving and driven sheaves, means supporting said countershaft for swinging movement relative to said distance varying means, resilient means for applying initial tension to said belts, and adjustable means co-operating with said resilient means for adjusting the position of said speed change device relative to said shifting means operated means to maintain the desired initial tension on said belts.

2. In a variable speed drive of the V-belt type, the combination, of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, means operated by said shifting means for varying the distance between the axes of the driving and driven sheaves and the axis of the speed change sheaves in predetermined ratio to the speed change shifting of the driving and driven sheaves, means supporting said countershaft for swinging movement relative to said distance-varying means, resilient means for applying initial tension to said belts, and adjustable means co-operating with said resilient means for adjusting the position of said speed change device relative to said shifting means operated means to maintain the desired initial tension on said belts, and indicia for indicating the desired adjusted position of said adjustable means.

3. In a variable speed drive of the V-belt type, the combination, of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, a cam bar, means operated by said shifting means for moving said cam bar to vary the distance between the axes of the driving and driven sheaves and the axis of the speed change sheaves in predetermined ratio to the speed change shifting of the driving and driven sheaves, a supporting bracket for said countershaft, means pivotally connecting said supporting bracket to said cam bar, an extension formed upon said supporting bracket, a sleeve adjustably carried by said extension, a rod slidably carried by said sleeve, a tensioned spring about said rod and engaging said sleeve, said spring tensioned to apply a pre-determined initial tension on said belts, means for adjusting the position of said sleeve relative to said rod and to said extension, and means for locking said sleeve and rod in adjusted positions.

4. In a variable speed transmission of the V-belt type, the combination, of an expansible driving sheave, an expansible driven sheave, a speed change device therebetween including a countershaft and expansible speed change driving and driven sheaves carried by said countershaft, each of said speed change sheaves including a flange keyed to the countershaft and a flange slidably and rotatably mounted thereon and provided within its bore with a lubricant retaining cylinder and bearings, telescoping driving members co-acting between adjacent flanges, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, a cam bar, means operated by said shifting means for moving said cam bar to vary the distance between the axes of the driving and driven sheaves and the axis of the speed change sheaves in predetermined ratio to the speed change shifting of the driving and driven sheaves, a supporting bracket for said cam shaft, means pivotally connecting said bracket to said cam bar, and resilient means co-operating with said bracket and said cam bar for regulating the initial tension applied to the belts.

5. In a variable speed drive of the V-belt type, the combination, of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, means operated by said shifting means for varying the distance between the axes of the driving and driven sheaves and the axis of the speed change sheaves in predetermined ratio to the speed change shifting of the driving and driven sheaves, a bracket connecting said countershaft to said distance varying means to permit limited movement of the countershaft relative to the distance varying means, resilient means for positioning said bracket and distance varying means in relative positions, and adjustable means for regulating the action of said resilient means.

6. In a variable speed drive of the V-belt type, the combination, of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, means operated by said shifting means for varying the distance between the axes of the driving and driven sheaves and the axis of the speed change sheaves in predetermined ratio to the speed change shifting of the driving and driven sheaves, a bracket connecting said countershaft to said distance varying means to permit limited movement of the countershaft relative to the distance varying means, resilient means for positioning said bracket and distance varying means in relative positions, adjustable means cooperating with said resilient means for initially regulating the position of said bracket relative to said distance varying means.

7. In a variable speed drive of the V-belt type, the combination, of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, means operated by said shifting means for varying the distance between the axes of the driving and driven sheaves and the axis of the speed change sheaves in predetermined ratio to the speed change shifting of the driving and driven sheaves, a bracket connecting said countershaft to said distance varying means to permit limited movement of the countershaft relative to the distance varying means, a spring means for positioning said bracket and distance varying means in relative positions, adjustable means cooperating with said spring means for initially regulating the position of said bracket relative to said distance varying means, said spring means having indicia thereon to indicate its predetermined position to apply proper tension on said belts at various predetermined load conditions on the drive.

8. In a variable speed drive of the V-belt type, the combination of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, means operated by said shifting means for varying the distance between the axes of the driving and driven sheaves and the axis of the speed change sheaves in predetermined ratio to the speed change shifting of the driving and driven sheaves, a bracket connecting said countershaft to said distance varying means to permit limited movement of the countershaft relative to the distance varying means, spring actuated means for positioning said bracket and distance varying means in relative positions, adjustable means cooperating with said spring actuated means for initially regulating the position of said bracket relative to said distance varying means, and adjustable means for regulating the tension of said spring actuated means.

9. In a variable speed drive of the V-belt type, the combination, of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, a cam bar, means operated by said shifting means for moving said cam bar to vary the distance between the axes of the driving and driven sheaves and the axis of the speed change sheaves in predetermined ratio to the speed change shifting of the driving and driven sheaves, a supporting bracket for said countershaft, means connecting said supporting bracket to said cam bar for movement of the supporting bracket relative to the cam bar, and spring actuated means adjustably carried by said bracket and engaging said cam bar for positioning said bracket in a predetermined relative position with respect to said cam bar to apply initial tension on said belts.

10. In a variable speed drive of the V-belt type, the combination, of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, a cam bar, means operated by said shifting means for moving said cam bar to vary the distance between the axes of the driving and driven sheaves and the axis of the speed change sheaves in predetermined ratio to the speed change shifting of the driving and driven sheaves, a supporting bracket for said countershaft, means connecting said supporting bracket to said cam bar for movement of the supporting bracket relative to the cam bar, spring actuated means adjustably carried by said bracket and engaging said cam bar for positioning said bracket in a predetermined relative position with respect to said cam bar to apply initial tension on said belts, and means for regulating the tension of said spring actuated means.

11. In a variable speed drive of the V-belt type, the combination, of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, a cam bar, means operated by said shifting means for moving said cam bar to vary the distance between the axes of the driving and driven sheaves and the axis of the speed change sheaves in predetermined ratio to the speed change shifting of the driving and driven sheaves, a supporting bracket for said countershaft, means connecting said supporting bracket to said cam bar for movement of the supporting bracket relative to the cam bar, spring actuated means adjustably carried by said bracket and engaging said cam bar for positioning said bracket in a predetermined relative position with respect to said cam bar to apply initial tension on said belts, means for regulating the tension on said spring actuated means, and said spring actuated means having indicia thereon to indicate its predetermined position to apply proper tension on said belts at various predetermined load conditions on the drive.

LOUIS E. SHAW.